July 4, 1967  H. L. SMITH, JR  3,329,506
METHOD FOR ROASTING COFFEE AND SIMILAR PARTICULATE SOLIDS
Filed Jan. 24, 1966  5 Sheets-Sheet 1

INVENTOR
HORACE L. SMITH, JR.

BY Strauch, Nolan, Neale,
Nies & Bronaugh
ATTORNEYS

July 4, 1967         H. L. SMITH, JR         3,329,506

METHOD FOR ROASTING COFFEE AND SIMILAR PARTICULATE SOLIDS

Filed Jan. 24, 1966         5 Sheets-Sheet 3

INVENTOR
HORACE L. SMITH, JR.

BY Strauch, Nolan, Neale, Nies & Bronaugh
ATTORNEYS

July 4, 1967  H. L. SMITH, JR  3,329,506
METHOD FOR ROASTING COFFEE AND SIMILAR PARTICULATE SOLIDS
Filed Jan. 24, 1966  5 Sheets-Sheet 5

INVENTOR
HORACE L. SMITH, JR.

BY  Strauch, Nolan, Neale,
Nies & Bronaugh
ATTORNEYS

United States Patent Office 3,329,506
Patented July 4, 1967

3,329,506
METHOD FOR ROASTING COFFEE AND SIMILAR PARTICULATE SOLIDS
Horace L. Smith, Jr., Richmond, Va., assignor to Hupp Corporation, Cleveland, Ohio, a corporation of Virginia
Filed Jan. 24, 1966, Ser. No. 522,690
9 Claims. (Cl. 99—68)

This invention relates to novel, improved methods of contacting fluids and solids.

In my U.S. Patent No. 3,189,460 issued June 15, 1965, and in my copending applications Nos. 425,702 filed Jan. 15, 1965, 522,503 filed Jan. 24, 1966, and 522,691 filed Jan. 24, 1966 I have disclosed novel methods of contacting fluids and particulate solids in which the solids are continuously and rapidly circulated by the treating fluid. This technique of treating solids with fluids has a number of important advantages. These include more efficient transfer of heat between the solids and the fluid, more uniform treatment of the solids, and decreased process times. The latter results in increased yields, higher quality, and other benefits depending upon the particular process involved. Other advantages are more accurate control of the process and greater versatility than is provided by other fluid-solids techniques.

In my earlier applications and the patent identified above a pattern of circulation is produced in which the solids being treated move upwardly in the outer portion of the bed and downwardly in its central portion. I have now discovered that the benefits of my earlier disclosed techniques may be retained and still other important advantages realized by employing a diametrically opposed pattern of circulation in which the solids move upwardly in the central portion of the bed and downwardly in its outer portion.

This pattern of circulation is established by using two co-operating streams of fluid to circulate the solids. The first stream is directed up into the bed of solids in a volume and at a velocity which in effect results in each of the particles in the bed being supported by the fluid. This virtually eliminates the friction between particles. The second stream of fluid is directed upwardly into the bed in its center region only at a velocity exceeding that of the first stream of fluid and the transport velocity of the solids. This stream of fluid causes the solids in the center portion of the bed to move upwardly.

At a level in the vicinity of the upper surface of the bed, the upwardly moving solids are deflected laterally toward the outer portion of the bed. This removes the solids from the influence of the second stream of fluid; and gravity draws them downward to the bottom of the bed where they are again entrained in and moved upwardly by the fluid stream.

One important advantage of the present invention over those I disclosed earlier is that it is less sensitive to variations in the volume of solids in the bed. In other words, wider variations may be made in the size of the load without adversely affecting the circulation of the solids.

Another important advantage of the present invention is that a reaction vessel constructed in accord with its principles has a greater capacity than one of equal size according to the teachings of my earlier disclosures. For example, one actual reaction vessel of the type disclosed in copending application No. 425,702 has a batch capacity of 850 pounds. A reaction vessel of equal size constructed in accord with the principles of this invention has a capacity of approximately 4,480 pounds [1].

A fluid-solids contact technique in which there is a pattern of circulation somewhat resembling that of the present invention is disclosed in, among others, U.S. Patents Nos. 2,437,694, 2,689,973, and 2,786,280 and German Patent No. 1,064,789. The foregoing patents all disclose what are known as "spouted beds" in which the solids move upwardly in a small spout in the center of the bed and migrate downwardly in the remaining, major, outer portion of the bed.

One important advantage of the pattern of circulation provided by the present invention over that produced in a spouted bed is that there is more uniform treatment of the solids because of their continuous rapid turnover. Solids treated by spouted bed techniques will many times contain particles of widely varying characteristics because there is an extremely slow turnover of the solids due to the sluggish downward migration of the solids in all but the central spout of a spouted bed. This is because the area of the spout is necessarily very small in comparison to the total area of the bed. As the non-spouted areas of the bed contain a very large part of the solids and as the volume of the solids moving downward in the non-spouted part of the bed cannot exceed the volume of solids moving upwardly in the spout while maintaining the stability of the bed, the downward migration of the solids is necessarily very slow. Moreover, spouted beds are subject to short-circuiting, which even further increases non-uniformity of the treated product.

The present invention also has a further advantage over spouted bed techniques in that a much larger bed of solids can be treated. As a practical matter, a spouted bed cannot be more than a few inches in diameter. As the width of the bed is increased, the diameter of the spout must be increased or the downward migration of the solids in the non-spouted portions of the bed will be so sluggish as to render the process useless. However, the power required to produce spouting increases much more rapidly than spout diameter; and, if the diameter of the spout is greater than a very few inches, the power required to produce it in other than a shallow bed of no practical utility is economically impracticable. Also, spouts in extremely shallow beds or in beds more than a few inches in diameter are unstable. This factor makes it further impracticable to produce spouted beds which are sufficiently large for use on a commercial scale.

Further advantages of the present invention over spouted bed techniques are, among others, more efficient heat transfer between the fluid and solids, decreased process times, more accurate process control, and greater versatility. The importance of these advantages are discussed above and in copending application No. 425,702.

From the foregoing, it will be apparent that one important object of the present invention resides in the provision of novel improved methods of contacting fluids and solids.

Other important objects of the present invention reside in the provision of methods of contacting fluids and solids which, in comparison to those utilizing the spouted bed and comparable heretofore known techniques:

---

[1] It is desirable to process a relatively deep bed of material in reaction vessels constructed in accord with the principles of this invention. If the bed is very shallow, the process fluid can flow upwardly near the outside of the vessel at a velocity high enough to cause the beans to move upward in this region, resulting in an uneven and otherwise undesirable pattern of circulation.

(1) provide a substantially more uniform treatment of the solids;

(2) are capable of treating a much larger volume of solids at one time;

(3) are substantially more efficient;

(4) provide decreased process times and greater process control;

(5) are more flexible and more versatile.

Further objects of the present invention reside in the provision of novel fluid-solids contact methods which have less sensitivity to variations in the volume and weight of the load being processed than those I have disclosed earlier and which are capable of processing a larger batch of solids in a reaction vessel of given size than the latter.

Yet another important but more specific object of the present invention resides in the provision of novel methods of contacting solids and fluids in which: (a) two streams of the fluid are employed to respectively minimize the friction between the particles in the bed of solids being processed and transport upwardly the particles in the center portion of the bed; and (b) the upwardly moving particles are moved outwardly and then migrate downwardly in the outer portion of the bed by gravity.

Other objects, further novel features, and additional advantages of the present invention will become apparent from the appended claims and as the ensuing detailed description and discussion proceeds in conjunction with the accompanying drawing, in which:

FIGURE 5 is a sectional view of a fluid heater incorporated in the system of FIGURE 1;

Figure 1:
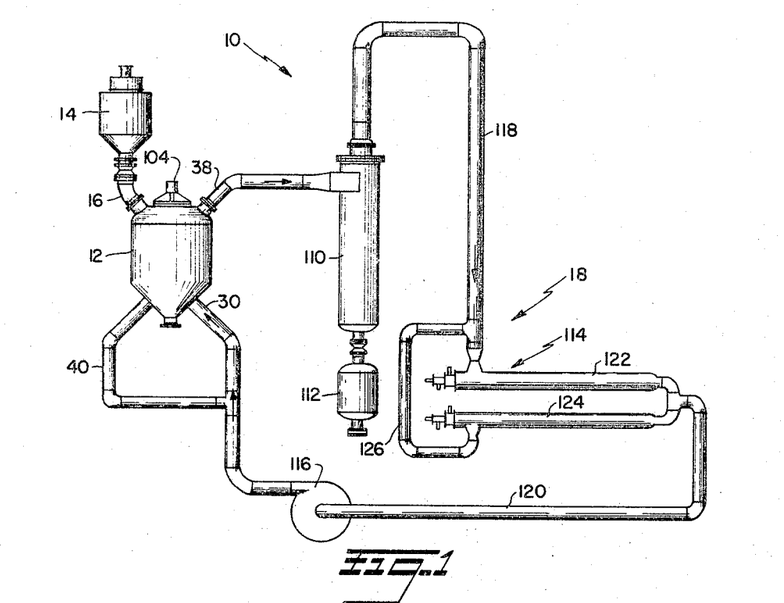
FIGURE 1 is a schematic illustration of a fluid-solids contacting system embodying the principles of the present invention which is particularly applicable to coffee roasting and similar processes in which particulate solids are roasted or otherwise heated.

Referring now to the drawing, FIGURE 1 depicts a solids treating plant or system 10 constructed in accord with the principles of the present invention for roasting coffee and similar processes in which the solids are heated by the treating fluid. Plant 10 includes, generally, a reaction vessel 12, into which the solids to be processed are loaded from a hopper 14 through a conduit 16, and a fluid heating and circulating system 18.[2]

Figure 2:
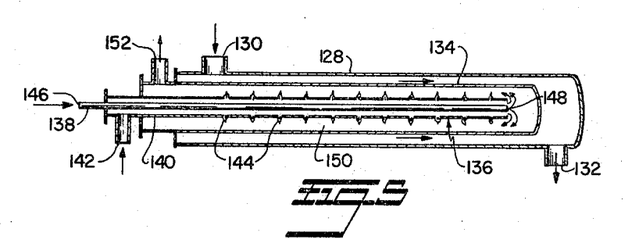
FIGURE 2 is a partly diagrammatic section through a reaction vessel incorporated in the system of FIGURE 1.

Referring now to FIGURE 2, the most important component of roasting plant 10 and one of the most important features of the present invention is reaction vessel 12, which includes a cylindrical, vertically oriented shell 20 closed by a top wall 22 and a frustoconical bottom wall 24. A central opening 26 is provided in reaction vessel bottom wall 24 for discharging processed solids from the reaction vessel.

A second aperture 28 in reaction vessel bottom wall 24 accommodates an inlet conduit 30 for a first stream of the process fluid. This stream of fluid flows from conduit 30 through a flow control assembly 32 and then upwardly through the bed 34 of solids being processed and through outlet 36 into exhaust conduits 38 (see FIGURE 1). A second stream of process fluid is supplied to reaction vessel 12 through a second inlet conduit 40 which extends through an aperture 42 in reaction vessel bottom wall 24 and terminates in a fluid distribution or nozzle assembly 44. From the nozzle assembly the second stream of process fluid flows upwardly through the central portion 46 of the bed of solids 34 being processed and then is exhausted from the reaction vessel through outlet 36 into exhaust conduit 38.

Also housed in reaction vessel outer shell 20 are a cylindrical, vertically oriented guide or shield 48, which regulates the movement of the solids in bed 34, and a baffle 50, which deflects the upwardly moving solids in the central portion 46 of the bed outwardly at a level in the vicinity of the top surface 52 of the bed. Shell 20 also houses a dump mechanism 54 which is actuatable to discharge the solids from the reaction vessel when the processing is complete.

The fluid flow control assembly 32 just mentioned distributes the stream of fluid entering reaction vessel 12 through inlet conduit 30 uniformly across bed 34 and directs it up into the bed. The volume and velocity of this stream of fluid are chosen so that it will substantially eliminate the friction between the particles in bed 34 by suspending the particles in the fluid. Thus suspended, the solids behave like a fluid and flow like water. At the same time, the velocity of the fluid stream is maintained below the transport velocity of the solids being processed so that this stream of fluid does not move the solids upwardly in the reaction vessel.

Flow control assembly 32 includes an outer frustoconical flow plate 56 bolted or otherwise fixed to the interior of reaction vessel shell 20 and an inner flow plate 58 adapted to be moved upwardly against and engage the lower edge of flow plate 56 to support the bed of solids. Flow apertures 60 are drilled or otherwise formed in the flow plate, preferably at an angle of approximately 45° to the upper surface 62 of flow plate 56 so that apertures 60 will be vertically oriented when the flow plate is installed in reaction vessel 12.

Inner flow plate 58 is also of frustoconical configuration and is typically fabricated in the same manner as outer flow plate 56. Flow apertures 64 are drilled or otherwise formed in nozzle plate 58. Like the apertures 60 in flow plate 56, apertures 64 are preferably at an angle of 45° to the upper surface 66 of flow plate 58 so that the apertures will be vertically oriented when the flow plate is installed in the reaction vessel.

The number and diameter of the apertures and the spacing between apertures may be varied as desired within the limits described above. That is, these parameters must be so selected that flow control assembly 32 will distribute the stream of fluid entering the reaction vessel through inlet conduit 30 uniformly over bed 34 and direct it upwardly through the bed of solids at a velocity below the transport velocity of the solids but sufficiently high to minimize the friction between the particles.

The angle nozzle plates 56 and 58 make with the horizontal may be increased, but should not be decreased substantially below 30°. This is to insure that the angle their upper surfaces 62 and 66 make with the horizontal exceeds the angle of repose of the solids being treated. If it does not, the solids will not slide off the nozzle plates when dump mechanism 54 is operated to discharge the treated solids from reaction vessel 12.

Flow plates of the type just described are above disclosed in greater detail in my copending application No. 425,702 to which reference may be made if deemed necessary for a more complete understanding of the present invention. The latter application also discloses other types of flow plates which may be substituted for those described above, if desired.

Circulation of the solids in bed 34 and fluidized or suspended in the treating fluid in the manner just de-

---

[2] System 10 and the modifications of this system disclosed and claimed herein may be operated at atmospheric pressure or at superatmospheric pressures, depending upon the application of the invention involved.

scribed is produced by the second stream of fluid entering reaction vessel 12 through inlet conduit 40 and by nozzle assembly 44, cylindrical guide 48, and baffle 50. Specifically, nozzle assembly 44 directs this stream of fluid upwardly into the central portion 46 of the bed of solids 34 at a velocity exceeding the transport velocity of the solids.

This fluid transports the solids in the central portion 46 of the bed upwardly as shown by arrows 68 in FIGURE 2.

At a level which is above the top of bed 34, the upwardly moving solids in the central portion 46 of the bed are deflected outwardly by baffle 50 to the outer annular portion 70 of the bed as shown by arrows 72 in FIGURE 2. This directs the solids out of the stream of fluid flowing upwardly through the central portion of the bed, permitting them to migrate downwardly by gravity in the outer portion 70 of the bed. They do this freely because the velocity of the fluid flowing upwardly in the outer portion of the bed has a sufficiently high velocity to eliminate friction between the particles but a sufficiently low velocity that it does not impede the downward movement of the particles.

As the downwardly moving particles approach the bottom of bed 34, they move inwardly toward the central portion 46 of the bed as shown by arrows 74 in FIGURE 2. When they reach the bottom of the bed, they are again entrained in the fluid supplied by nozzle assembly 44 and the circulation cycle repeated.

The cylindrical baffle 48 mentioned above separates the central portion 46 of bed 34 from its outer portion 70 and, therefore, prevents interference between the upwardly moving particles in the central portion of the bed and the downwardly moving particles in the outer portion of the bed. Shield 48 also confines the stream of fluid supplied by nozzle assembly 44 to the central portion 46 of the bed, which prevents it from being dissipated. This further assists in maintaining the desired pattern of circulation.

Figure 3:
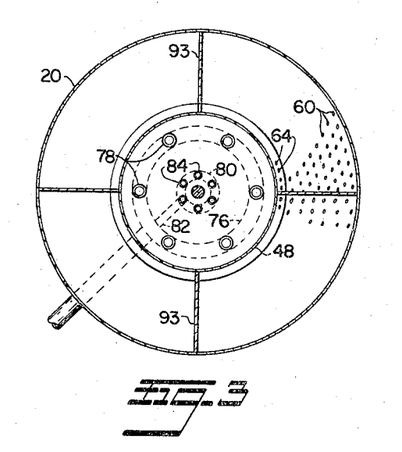
FIGURE 3 is a section through the reaction vessel, taken substantially along line 3—3 of FIGURE 2.

Referring now to both FIGURES 2 and 3, nozzle assembly 44 includes a circular header 76 connected to inlet conduit 40 and disposed in the bottom part of reaction vessel 12 below flow control assembly 32. Fixed to and extending vertically upward from header 76 and through inner flow plate 58 into the bottom part of the central portion 46 of bed 34 are nozzle pipes 78. The nozzle pipes are uniformly spaced around header 76; and, as shown in FIGURES 2 and 3, header 76 is disposed in parallel, spaced relationship to the shell 20 of reaction vessel 12. Thus, nozzle pipes 78 are uniformly spaced from the center of bed 34. The nozzle pipes are arranged in this manner so that the stream of fluid entering the reaction vessel through conduit 40 will be evenly distributed over the central portion 46 of bed 34.

Nozzle assembly 44 also includes a second circular header 80 encircled by and concentric with header 76 and connected to the latter by conduit 82. Nozzle pipes 84, which are similar to nozzle pipes 78 and fixed to header 80 at equidistant intervals, extend upwardly through inner flow plate 58 into the lower part of the central portion 46 of bed 34 like nozzle pipes 78. Nozzle pipes 84 may have a smaller diameter than nozzle pipes 78. This is so they will supply less fluid to the shallower central part of the bed where they are located than is supplied to the outer boundary of inner portion 46, where nozzle pipes 78 are disposed. Such a distribution of the fluid results in uniform upward movement of the solids in the central portion of the bed.

The number and size of nozzle pipes 78 and 84 may be varied as desired. It is, however, preferred that the two sets of nozzle pipes be so selected that all of the particles in the bed of solids will be uniformly circulated. Moreover, if desired, nozzle assembly 44 can be omitted altogether and the second stream of process fluid supplied through additional apertures 64 in the inner flow plate 58.

Referring again to FIGURE 2, the baffle 50 by which the upwardly moving solids are laterally deflected is made of sheet metal or any other desired material and has the same peripheral configuration as reaction vessel shell 20. It may be supported in reaction vessel 12 by fixing it to a vertical shaft 86 incorporated in dump mechanism 54 or in any other desired manner. The lower surface 88 of baffle 50 continuously curves from the vertical or a very steep inclination at its inner edge 90 to the horizontal or a very slight inclination at its outer edge 92. Baffle 50 therefore directs the upwardly moving solids impinging on it from a vertical path to a horizontal path, the inertia of the solids carrying them to the outer portion 70 of bed 34 where the downward migration occurs.

The cylindrical shield 48 by which the upwardly and downwardly moving solids are separated may be made of any satisfactory sheet material such as stainless steel. It is supported in reaction vessel 12 in any desired manner such as by brackets 93 as shown in FIGURE 3. At its upper end 94 the shield terminates below baffle 50, providing a passage 96 for the outwardly moving solids. Similarly, the lower end 98 of the shield terminates well above flow control assembly 32, providing a passage 100 for the solids sliding down flow plate 56 to the central portion 46 of bed 34.

As mentioned previously, the processed solids are discharged from reaction vessel by actuating dump mechanism 54 at the end of the processing cycle. Dump mechanism 54 includes the previously mentioned vertical shaft 86 from which solids deflecting baffle 50 may be supported. At its lower end, shaft 86 supports the inner flow plate 58 of flow control assembly 32. The upper end of shaft 86 is connected to the piston rod 102 of a hydraulic motor 104 supported from the top wall 22 of reaction vessel 12 by a diagrammatically illustrated support assembly 106.

Figure 4:
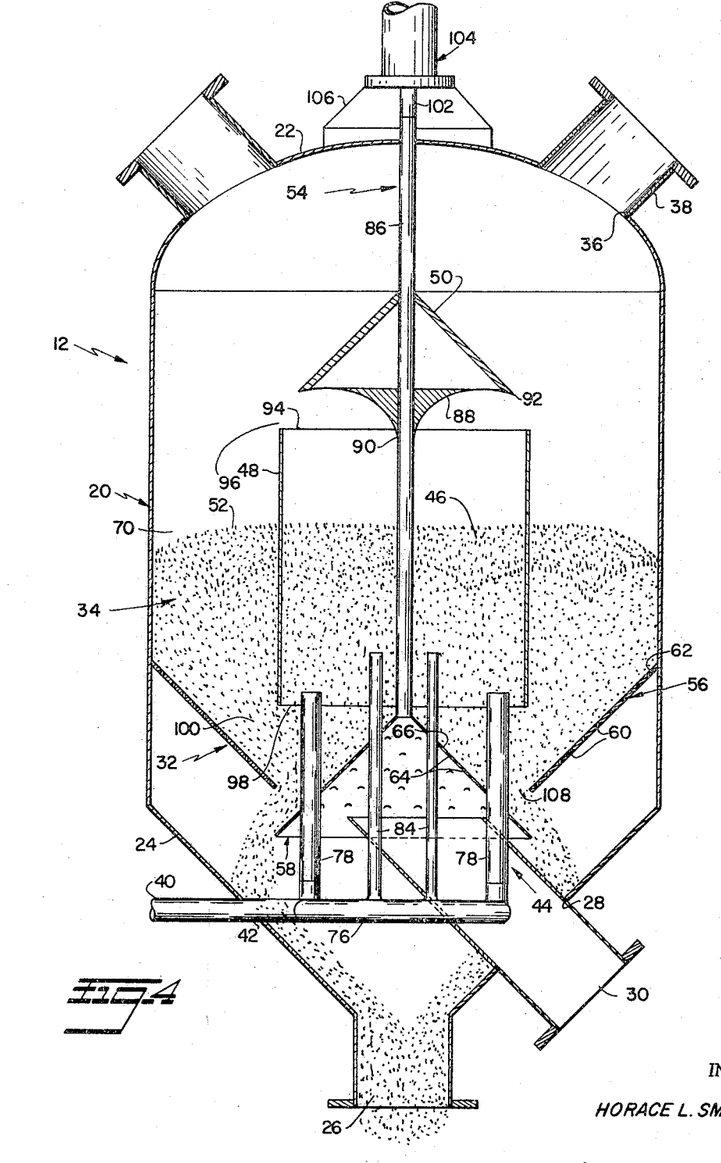
FIGURE 4 is a view similar to FIGURE 2, showing certain internal components of the reaction vessel positioned to discharge the solids being processed from the vessel.

To discharge the processed solids from reaction vessel 12, operating fluid is admitted to the upper end of hydraulic motor 104. This moves piston rod 102 and shaft 86 downwardly, lowering flow plate 58 from the position shown in FIGURE 2 to that shown in FIGURE 4 in which there is a gap 108 between the flow plates. The processed solids flow through this gap into the lower part of reaction vessel 12, down its inclined bottom wall 24, and out dump opening 26 to a conveyor or other handling equipment. When the last of the solids has been discharged from the reaction vessel, operating fluid is admitted to the lower end of hydraulic motor 104. This moves piston rod 102 and shaft 86 upwardly, returning inner flow plate 58 to the position shown in FIGURE 2 to provide a support for the bed of solids.

In addition to the novel reaction vessel 12 just described, the system 10 illustrated in FIGURE 1 has a fluid heating and circulating system 18, as mentioned previously. System 18 includes in addition to the fluid conduits 30, 40, and 38 described above, a chaff separator 110, a chaff collector 112, a fluid heating unit 114, a blower 116 for circulating the fluid, a conduit 118 connecting chaff separator 110 to heating unit 114, and a conduit 120 connecting heating unit 114 to blower 116.

Chaff separator 110 removes chaff and other foreign substances from the fluid returning to heating unit 114 from the reaction vessel. The chaff thus separated accumulates in chaff collector 112 from which it may be removed at appropriate intervals. A suitable chaff separator and chaff collector are disclosed in my issued Patent No. 3,189,460. For this reason and because the details of these components form no part of the present invention, it is not deemed necessary to describe them further.

The cleaned air flows from chaff separator 110 through duct 118 to heating unit 114, which includes two identical fluid heaters 122 and 124. As shown in FIGURE 1, heaters 122 and 124 are connected in parallel by a branch duct 126 so that half of the recirculated fluid is heated in each of the heaters. Additional heaters may be similarly connected in system 18 if the volume of recirculated fluid dictates. Similarly, if the volume of recirculated fluid is sufficiently low, heater 124 may be omitted and a single heater 122 employed.

Referring now to FIGURE 5, fluid heaters 122 and 124 each include an elongated housing 128 closed at both ends. An inlet 130 adjacent one end of housing 128 is connected to the outlet of return duct 118, and an outlet 132 adjacent the opposite end is connected to the inlet of supply duct 120. Fluid recirculated through ducts 38 and 118 therefore enters housing 128 through inlet 130 at one end, flows the length of the housing, and exits from the outlet 132 at the opposite end.

As the recirculated fluid flows through housing 128 it is heated by a heating unit including an elongated closed tube 134 over which the fluid flows and a burner 136 disposed within the tube. Burner 136 includes a fuel supply and preheater tube 138 surrounded by a combustion air supply tube 140 provided with an inlet 142 and a plurality of outlets 144. Fuel enters tube 138 through an inlet 146 in one end and flows the length of the preheater, in which it is heated to increase the efficiency of the combustion process. The heated fuel exits from an outlet 148 in the opposite end of the preheater and then flows back toward the inlet end in the annular passage 150 between combustion air tube 140 and the outer, process fluid heating tube 134. As the fuel flows back toward the inlet end of the preheater, it is mixed with air discharged from tube 140 through outlets 144 to form a combustible mixture which may be ignited in any desired manner. The hot combustion products flow back toward the inlet end of the burner, increasing the temperature of fluid heating tube 134 and then exit from the burner through flue outlet 152.[3]

Fluid heaters of the type described briefly above are disclosed in more detail in Bulletin No. 102 of the Hazen Engineering Company. For this reason and because the details of the fluid heater form no part of the present invention, it is not deemed necessary to describe this heater further herein.

From heating unit 114, the reheated fluid is circulated by blower 116 through ducts 120, 30, and 40 to reaction vessel 12 as mentioned previously.

Figure 6:
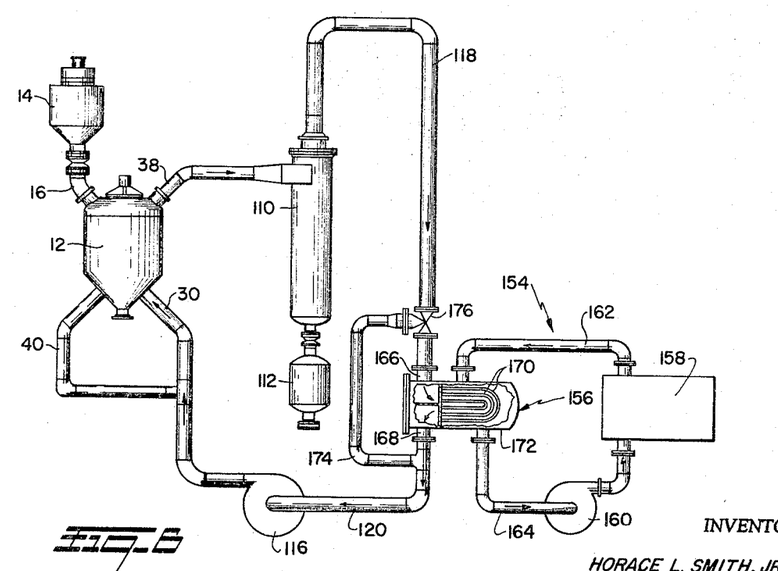
FIGURE 6 is a schematic illustration of a second type of fluid heating unit which may be employed in the system of FIGURE 1.

FIGURE 6 illustrates a fluid heating unit 154 which may be substituted for heating unit 114 in fluid heating and circulation system 18. This unit includes a heat exchanger 156, a liquid heater 158, and a pump 160 for circulating a liquid heat transfer medium between the heater and heat exchanger through supply and return conduits 162 and 164. Heat exchanger 156 has an inlet 166 connected to the outlet of fluid return duct 118 and an outlet 168 connected to the inlet of fluid supply duct 120. Fluid recirculated from reaction vessel 12 through duct 118 accordingly flows into heat exchanger 156, through heat exchanger tubes 170, and out outlet 168 into supply conduit 120. As the fluid flows through tubes 170, it is heated by the circulating heat transfer medium, which flows from supply conduit 162 into the casing 172 of the heat exchanger, over heat exchanger tubes 170, and into return conduit 164.

The temperature of the fluid supplied to the reaction vessel can be adjusted by proportioning the fluid recirculated to heating unit 154 between heat exchanger 156 and a bypass duct 174 connected between return duct 118 and supply duct 120. The recirculated process fluid is proportioned between heat exchanger 156 and bypass duct 174 by a bypass valve 176. The bypass valve, in turn, is operated by a conventional temperature controller (not shown) having a sensor responsive to the temperature of the fluid in supply conduit 120. If the temperature of the fluid in the supply duct increases beyond the desired level, valve 176 is adjusted to divert more fluid through bypass duct 174, reducing the fluid temperature. Similarly, if the fluid temperature becomes too low, increasing amounts of the fluid are directed through the heat exchanger to restore the temperature to the desired level.

The fluid heating system just described is disclosed in more detail in my copending application No. 237,817 filed Nov. 15, 1962 for High Temperature Heating Apparatus (now Patent No. 3,236,292), which is hereby incorporated herein by reference. A further description of this heating unit is therefore not considered necessary.

It is also to be understood that it is not necessary but only preferable to employ the heating units described above to heat the fluid for system 10. Other heating units such as those described in my copending applications referred to above may be used instead, if desired.

Figure 7:
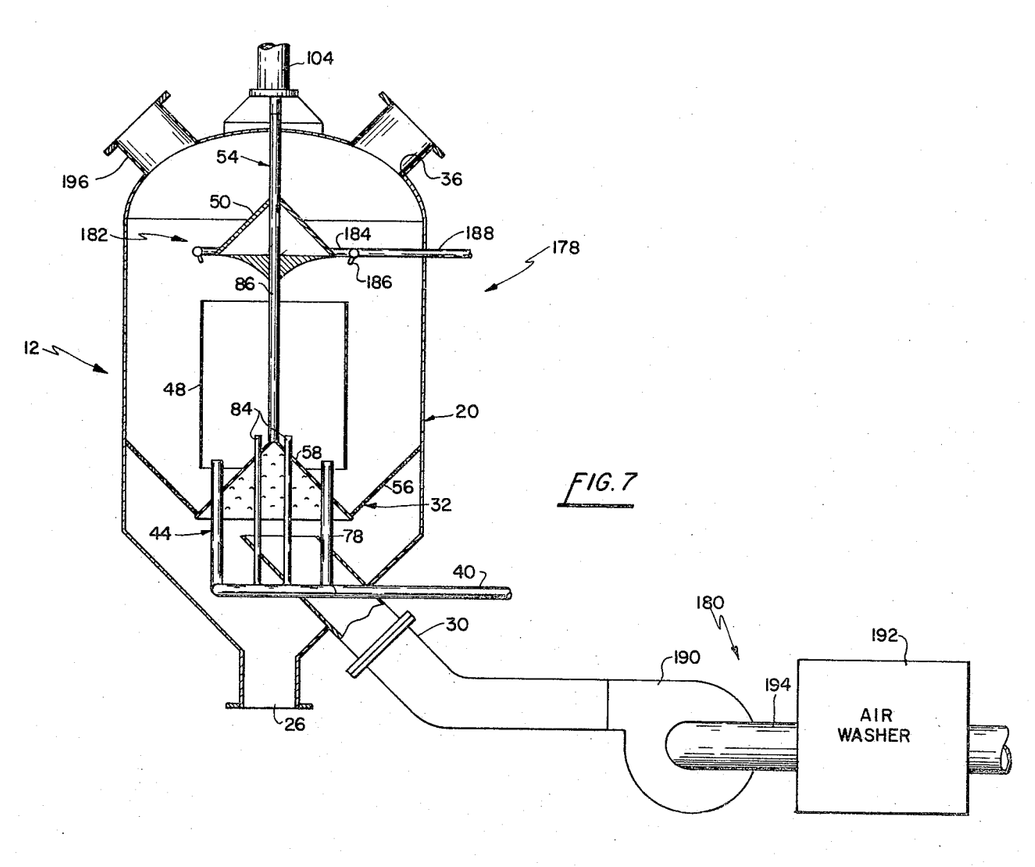
FIGURE 7 is a partially sectional and partially schematic illustration of fluid-solids contact apparatus which is particularly adapted for cooling particulate solids.

FIGURE 7 illustrates a fluid-solids contact system 178, constructed in accord with the principles of the present invention, which is designed for cooling particulate solids. One specific, but by no means the only, application of system 178 is the cooling of roasted coffee beans.

With the exceptions discussed below, cooling system 178 is identical to the heating system 10 described above. The same reference characters have accordingly been employed to identify the components which are the same in both systems.

Referring now to FIGURE 7, system 178 is similar to system 10 except that fluid heating and circulating system 18 is replaced with a fluid treating and circulating system 180. Also, reaction vessel 12 is provided with a spray system 182 through which an inert liquid is sprayed onto the solids to rapidly reduce their temperature and thereby prevent residual-heat induced changes.

Spray system 182 includes a spray header 184 supported in any desired manner in reaction vessel 12 above the upper surface of the bed of solids being processed. Located at equidistant intervals along header 184 are spray nozzles 186. Header 184 is connected to any convenient source of inert liquid medium, generally water, by conduit 188. The water or other liquid flows through header 184 and out nozzles 186 onto the solids in reaction vessel 12 in the form of a fine mist.

To insure uniform application of the liquid to the solids, the bed of solids is circulated in the manner described above while the solids are being sprayed with fluid supplied to the reaction vessel by a blower 190 incorporated in fluid treating and circulating system 180. In addition to circulating the solids, the fluid supplied to the reaction vessel by blower 190 provides substantial cooling of the solids.

To increase the heat absorbing capacity of the fluid, which will be ambient air in many cases, an air washer 192 of conventional construction is connected by a conduit 194 to the inlet of blower 190. Air washer 192 cools the process fluid and increases its moisture content, thereby materially increasing its capacity to remove heat from the solids being cooled. The function and advantages of employing an air washer and a suitable form of air washer are described in more detail in my copending application No. 522,503, to which reference may be had if desired.

In operation, the solids to be cooled are dumped into reaction vessel 12 through inlet 196; and blower 190 is then started to circulate the solids. After circulation has been established, spray system 182 is actuated to rapidly reduce the temperature of the solids and thereby prevent residual-heat induced changes in them. The spray may be terminated simultaneously with the supply of the process fluid or prior to this point, in which case the cooling may be completed by the process fluid alone.

---

[3] In applications of the present invention where an inert process fluid can be beneficially employed such as coffee roasting, the combustion products can be employed as the process fluid.

Further details of this mode of cooling particulate solids and its advantages are described in copending application 522,503, to which reference may be had if deemed necessary.

Many modifications may be made in the exemplary apparatus described above in applying the principles of the present invention. For example, other fluid supplying systems may be substituted for those discussed above where the particular application of the present invention dictates; and heating and cooling may be accomplished in one reaction vessel, if desired. Further modifications which may be made to the illustrated structure will be apparent from my copending applications referred to above; and still other modifications will readily occur to those to whom this application is directed. To the extent that such modifications are not expressly excluded therefrom, they are fully intended to be covered by the appended claims.

As mentioned above, important applications of the present invention reside in the roasting of coffee and the cooling of the roasted beans. However, these are by no means the only applications of the present invention, which is applicable generally to fluid-solids contact processes. Such applications of this invention are not expressly excluded from the appended claims are therefore also intended to be embraced therein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of roasting coffee beans and similar particulate solids with a fluid medium in a reaction vessel adapted to contain a bed of the solids to be processed therein comprising the steps of:
   (a) reducing the friction between the particles in the bed of solids by directing a first uniformly distributed stream of fluid upwardly into said bed at a velocity which is below the transport velocity of the solids in said bed but is sufficiently high to support said particles;
   (b) causing an upward movement of the particles in the central portion of said bed by directing a second stream of fluid upwardly into said bed solely in the central portion thereof, said second stream of fluid being introduced into said bed at at least one set of locations spaced from the center of said bed and substantially equidistantly spaced from each other; and
   (c) deflecting the upwardly moving particles toward the outer region of the bed at a level in the vicinity of its upper surface to allow a downward movement of said particles by gravity;
   (d) whereby there is a continuous and rapid turnover of said solids and intimate and uniform contact between the fluid and the particles in said bed;
   (e) the fluid in at least one of the streams being heated to a temperature sufficiently high to roast said solids, whereby said solids are roasted by the fluid utilized to effect the turnover of the solids;
   (f) the temperature and composition of the fluid introduced into the reaction vessel being so regulated as to prevent combustion of the solids therein; and
   (g) the flow of fluid through the bed being continued until the solids therein are roasted.

2. The method of claim 1, together with the step of spraying a liquid medium onto the circulating solids to rapidly reduce the temperature of and thereby minimize residual-heat-induced changes in said solids.

3. The method of claim 1, wherein said second stream of fluid is introduced into said bed of solids at a higher velocity than said first stream of fluid.

4. The method of claim 1, together with the step of maintaining a superatmospheric pressure on said bed of solids during the treatment thereof.

5. The method of claim 1, wherein the treating fluid is substantially chemically inert with respect to said solids at the temperature at which it is introduced into the bed of solids.

6. The method of claim 1, together with the step of mechanically confining the upwardly moving particles to a region generally coextensive in area with the central portion of said bed to prevent interference between the upwardly moving particles and the particles moving downwardly in the outer portion of said bed.

7. The method of roasting coffee beans and similar particulate solids with a fluid medium in a reaction vessel adapted to contain a bed of solids to be processed comprising the steps of:
   (a) introducing the solids to be processed into said reaction vessel and forming the solids thus introduced into a bed which has an inclined lower boundary in the central portion thereof so that said central portion is of varying thickness;
   (b) reducing the friction between the particles in the bed of solids by directing a first uniformly distributed stream of fluid upwardly into said bed at a velocity which is below the transport velocity of the solids in said bed but is sufficiently high to support said particles;
   (c) causing an upward movement of the particles in the central portion of said bed by directing a second stream of fluid upwardly into said bed solely in the central portion thereof, said second stream of fluid being introduced into said bed at first and second sets of locations spaced from the center of the bed and from each other, the locations in each of said sets being substantially equidistantly spaced from one another and the portion of said stream introduced into said bed at each set of locations being proportional to the thickness of said bed thereat so that said second stream of fluid will effect a uniform upward movement of the particles in the central portion of the bed;
   (d) deflecting the upwardly moving particles toward the outer region of the bed at a level in the vicinity of its upper surface to allow a downward movement of said particles by gravity;
   (e) whereby there is a continuous and rapid turnover of said solids and intimate and uniform contact between the fluid and the particles in said bed;
   (f) the fluid in at least one of said streams being heated, whereby the roasting of the solids is effected by fluid utilized to effect the turnover of the solids.

8. The method of roasting coffee beans and similar particulate solids with a fluid medium in a reaction vessel adapted to contain a bed of the solids to be processed therein, comprising the steps of:
   (a) introducing the solids to be roasted into the reaction vessel in a single batch to form therein a single bed of unroasted beans at least substantially spanning the reaction vessel;
   (b) reducing the friction between the particles in the bed of solids by directing a first uniformly distributed stream of fluid upwardly into said bed at a velocity which is below the transport velocity of the solids in said bed but is sufficiently high to support said particles;
   (c) causing an upward movement of the particles in the central portion of said bed by directing a second stream of fluid upwardly into said bed solely in the central portion thereof, said second stream of fluid being introduced into said bed at at least one set of locations spaced from the center of said bed and substantially equidistantly spaced from each other; and (d) deflecting the upwardly moving particles toward the outer region of the bed at a level in the vicinity of its upper surface to allow a downward movement of said particles by gravity;

(e) whereby there is a continuous and rapid turnover of said solids and intimate and uniform contact between the fluid and the particles in said bed;

(f) the fluid in at least one of said streams being heated to a temperature sufficiently high to roast said solids and said heated fluid being the only source of heat supplied to said reaction vessel, whereby said solids are roasted substantially solely by heat supplied to the reaction vessel via said fluid; and (g) the flow of fluid through the bed being continued until the solids therein are roasted.

9. The method of roasting coffee and similar particulate solids with a fluid medium in a reaction vessel adapted to contain a bed of the solids to be processed therein comprising the steps of:

(a) reducing the friction between the particles in the bed of solids by directing a first uniformly distributed stream of fluid upwardly into said bed at a velocity which is below the transport velocity of the solids in said bed but is sufficiently high to support said particles;

(b) causing an upward movement of the particles in the central portion of said bed by directing a second stream of fluid upwardly into said bed solely in the central portion thereof, said second stream of fluid being introduced into said bed at at least one set of locations spaced from the center of said bed and substantially equidistantly spaced from each other; and (c) deflecting the upwardly moving particles toward the outer region of the bed at a level in the vicinity of its upper surface to allow a downward movement of said particles by gravity;

(d) whereby there is a continuous and rapid turnover of said solids and intimate and uniform contact between the fluid and the particles in said bed;

(e) the fluid in at least one of said streams being heated to a temperature sufficiently high to roast said solids, whereby said solids are roasted by the fluid utilized to effect the turnover of the solids;

(f) the fluid in said streams being substantially oxygen free products of combustion, whereby said solids are roasted in atmosphere of controlled, generally oxygen-free composition; and (g) the flow of fluid through the bed being continued until the solids therein are roasted.

References Cited

UNITED STATES PATENTS

| | | | |
|---|---|---|---|
| 2,105,778 | 1/1938 | Behr et al. | |
| 2,292,897 | 8/1942 | Nielsen. | |
| 2,582,711 | 1/1952 | Nelson | 201—31 |
| 2,700,644 | 1/1955 | Lefler | 201—31 |
| 2,709,675 | 5/1955 | Phinney | 201—31 |
| 2,906,608 | 9/1959 | Jequier et al. | |
| 3,053,642 | 9/1962 | Huntley et al. | 23—284 XR |
| 3,110,626 | 11/1963 | Larson et al. | |
| 3,112,220 | 11/1963 | Heiser et al. | |
| 3,169,380 | 2/1965 | Callow et al. | 62—57 |
| 3,189,460 | 6/1965 | Smith | 99—68 |

FOREIGN PATENTS

| | | |
|---|---|---|
| 244,239 | 4/1960 | Australia. |
| 544,638 | 8/1957 | Canada. |

OTHER REFERENCES

Sivetz et al.: "Coffee Processing Technology," vol. I, 1963, The Avi Publishing Co., Inc., Westport, Conn., page 208.

A. LOUIS MONACELL, *Primary Examiner.*

JOSEPH M. GOLIAN, HYMAN LORD, *Examiners.*

M. W. GREENSTEIN, *Assistant Examiner.*